United States Patent
O'Masta et al.

(10) Patent No.: US 12,514,003 B2
(45) Date of Patent: Dec. 30, 2025

(54) CURVED IMAGING SENSOR PACKAGE WITH PETAL PATTERNED SUBSTRATE

(71) Applicant: HRL LABORATORIES, LLC, Malibu, CA (US)

(72) Inventors: Mark O'Masta, Malibu, CA (US); Jacob Hundley, Thousand Oaks, CA (US); Jensen Severance, Malibu, CA (US); Brian Hempe, Malibu, CA (US); Christopher Roper, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 392 days.

(21) Appl. No.: 18/299,550

(22) Filed: Apr. 12, 2023

(65) Prior Publication Data

US 2023/0253431 A1 Aug. 10, 2023

Related U.S. Application Data

(63) Continuation-in-part of application No. 17/111,108, filed on Dec. 3, 2020, now Pat. No. 11,862,653.

(60) Provisional application No. 63/413,537, filed on Oct. 5, 2022, provisional application No. 63/004,197, filed on Apr. 2, 2020.

(51) Int. Cl.
*H10F 39/00* (2025.01)

(52) U.S. Cl.
CPC .................. *H10F 39/026* (2025.01)

(58) Field of Classification Search
CPC ...... H10F 39/026; H10F 39/024; H10F 39/18; H10F 39/8027; H10F 39/804; H10F 39/805
USPC ........................................................... 348/294
See application file for complete search history.

(56) References Cited

U.S. PATENT DOCUMENTS

| | | | | |
|---|---|---|---|---|
| 4,467,361 A * | 8/1984 | Ohno | ................. | G02B 27/0025 348/307 |
| 5,510,273 A * | 4/1996 | Quinn | ................... | H01L 25/042 257/E21.705 |
| 6,285,400 B1 * | 9/2001 | Hokari | ................. | H04N 25/702 348/374 |
| 6,486,917 B2 * | 11/2002 | Iwasaki | ................... | H04N 23/81 348/340 |
| 6,791,072 B1 * | 9/2004 | Prabhu | ................. | H10F 39/806 257/E31.117 |
| 6,839,135 B2 * | 1/2005 | Hamm | ................. | G01J 3/2803 257/E31.128 |
| 7,072,120 B2 * | 7/2006 | Lan | ........................ | H04N 25/61 359/664 |

(Continued)

OTHER PUBLICATIONS

International Search Report and Written Opinion issued in corresponding International Application No. PCT/US2020/063143, dated Mar. 21, 2021, 9 pages.

(Continued)

*Primary Examiner* — Usman A Khan
(74) *Attorney, Agent, or Firm* — Lewis Roca Rothgerber Christie LLP

(57) ABSTRACT

An imaging sensor package including: an imaging sensor; and a patterned substrate coupled to a surface of the imaging sensor. The imaging sensor and the patterned substrate being (Continued)

curved. The patterned substrate having a petal-shaped patterned area having a first thickness and a base substrate having a second thickness, the first thickness being greater than the second thickness.

21 Claims, 15 Drawing Sheets

(56) References Cited

U.S. PATENT DOCUMENTS

| | | | |
|---|---|---|---|
| 9,570,488 B2 | 2/2017 | McKnight et al. | |
| 9,870,927 B2 | 1/2018 | Keefe et al. | |
| 10,062,727 B2* | 8/2018 | McKnight | H01L 21/67092 |
| 2001/0020671 A1* | 9/2001 | Ansorge | H10F 39/011 |
| | | | 257/E27.131 |
| 2003/0230707 A1* | 12/2003 | Hogan | H04N 23/75 |
| | | | 348/E5.04 |
| 2003/0231245 A1* | 12/2003 | Bacarella | H04N 23/55 |
| | | | 348/E5.025 |
| 2005/0109918 A1* | 5/2005 | Nikzad | H10F 39/80 |
| | | | 257/E27.151 |
| 2006/0124831 A1* | 6/2006 | Schimert | G01J 5/20 |
| | | | 250/214 R |
| 2007/0108890 A1* | 5/2007 | Forrest | B29D 11/02 |
| | | | 313/504 |
| 2007/0170363 A1 | 7/2007 | Schimert et al. | |
| 2009/0115875 A1* | 5/2009 | Choi | H01L 24/97 |
| | | | 257/E31.127 |
| 2009/0224344 A1* | 9/2009 | Huang | H10F 39/804 |
| | | | 257/432 |
| 2016/0086994 A1* | 3/2016 | Guenter | H10F 39/806 |
| | | | 257/466 |
| 2016/0293661 A1* | 10/2016 | Keefe | H10F 39/011 |
| 2017/0040306 A1* | 2/2017 | Kim | H01L 23/49894 |

OTHER PUBLICATIONS

Chambion, B., "Tunable curvature of large visible CMOS image sensors: Towards new optical functions and system miniaturization," 2016 IEEE 66$^{th}$ Electronic Components and Technology Conference, Electronic ISBN: 978-1-5090-1204-6, pp. 178-187.

Gaschet, C., "Curved sensors for compact high resolution wide field designs," Proceedings of SPIE, HRL with Microsoft, 2017, 12 pages.

Gaschet, C., "Methodology to design optical systems with curved sensors," Applied Optics, vol. 58, No. 4, Feb. 1, 2019, pp. 973-978, https://doi.org/10.1364/AO.58.000973.

Gregory. J., "Development and application of spherically curved charge-coupled device imagers," Applied Optics, vol. 54, No. 10, Apr. 1, 2015, pp. 3072-3082, https://doi.org/10.1364/AO.54.003072.

Guenter, B., "Highly curved image sensors: a practical approach for improved optical performance," Optics Express. vol. 25, No. 12, Jun. 12, 2017, 13010-13023, doi:10.1364/OE.25.013010.

Lee, G.J., "Bioinspired Artificial Eyes: Optic Components, Digital Cameras, and Visual Prostheses," Advanced Science News, Advanced Functional Materials, 2018, 17 pages, DOI: 10.1002/adfm.201705202.

Lombardo, "Curved sensors developments and characterization: application to astronomical instruments," Proceedings of SPIE, 2018, 10 pages, doi: 10.1117/12.2312654.

Chinese Office Action for CN Application No. 202080094633.7 dated Oct. 29, 2024, 9 pages.

* cited by examiner

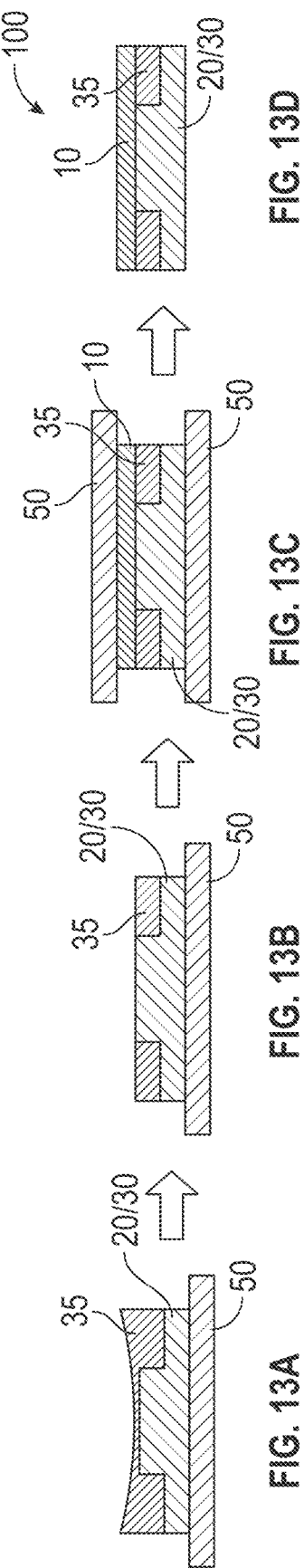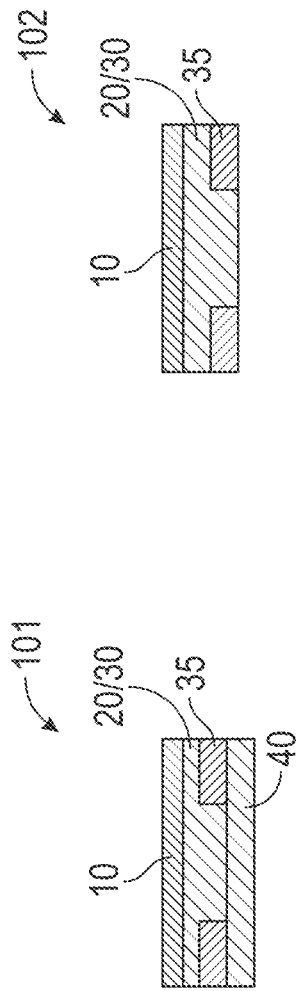

CURVED IMAGING SENSOR PACKAGE WITH PETAL PATTERNED SUBSTRATE

CROSS-REFERENCE TO RELATED APPLICATION

The present application is a continuation-in-part of U.S. patent application Ser. No. 17/111,108, filed on Dec. 3, 2020, which claims priority to and the benefit of U.S. Provisional Application Ser. No. 63/004,197, filed on Apr. 2, 2020; and claims priority to and the benefit of U.S. Provisional Patent Application Ser. No. 63/413,537, filed on Oct. 5, 2022, the entire content of each of which is incorporated herein by reference.

STATEMENT REGARDING FEDERALLY SPONSORED RESEARCH OR DEVELOPMENT

This invention was made with U.S. Government support under Contract Number N66001-20-C-4011, awarded by Defense Advanced Research Projects Agency. The U.S. Government has certain rights in the invention.

FIELD

One or more aspects of embodiments of the present disclosure relate to a curved imaging sensor package with a petal patterned substrate.

BACKGROUND

Recently, the demand for imaging sensors (e.g., optical imaging sensors), such as complementary metal-oxide-semiconductor (CMOS) and charge-coupled device (CCD) sensors for optical imaging systems (e.g., optical cameras), infrared imaging systems (e.g., infrared cameras), light detection and ranging (LIDAR) systems, infrared search and track (IRST) systems, imaging satellites, etc., has rapidly increased.

Related art imaging sensors are flat (also referred to as flat focal plane arrays (FPA)) for ease of manufacture. To project the incident light (e.g., visible light, infrared radiation, etc.) onto a flat focal plane, flat imaging sensors generally include lenses and/or other optical devices so that flat imaging sensor accurately captures and interprets the incident light. Curved imaging sensors, on the other hand, do not require the same complex optics as the need to correct for spherical aberration encountered when projecting incident light onto a flat focal plane (e.g., the need to create a flat focal plane) is reduced or eliminated. As such, curved imaging sensors allow for a wider range of lens designs and may be able to acquire sharper, more detailed images and operate with lower light levels, thereby extending the operational window (e.g., the operational parameters) for the imaging device when compared to related art flat imaging sensors. Also, due to the reduced optics complexity for curved imaging sensors, the size (e.g., the volume and weight) of the imaging system may be reduced when compared to flat imaging sensors, thereby enabling new applications. Furthermore, a curved imaging sensor, which has a curved focal plane, may maintain uniform or substantially uniform illumination across the entire field of view (FOV) for wide FOV imagers, and the optical simplicity reduces transmission losses, thereby increasing the possible frame rate.

Curving a flat imaging sensor (e.g., a flat focal plane array (FPA)) to have a curved (e.g., spherical) surface is challenging, and curving an imaging sensor about two axes with a non-zero Gaussian curvature is increasingly challenging as the size of the imaging sensor increases and the radius of curvature (ROC) decreases due to increasing strain in the imaging sensor. Increasing strain in the imaging sensor may lead to breakage, and when the strain across an imaging sensor is highly non-linear, which is typical when spherically curving a flat imaging sensor, the output (e.g., the electronic response) of the imaging sensor may be considerably and non-uniformly shifted, affecting dark noise and operability.

SUMMARY

Aspects of embodiments of the present disclosure provide a curved imaging sensor package that may be larger and may be curved to have a tighter radius of curvature than related art curved imaging sensors without breakage and without suffering from degraded imaging performance by including an architected substrate under an imaging sensor. The curved imaging sensor package includes a patterned substrate (e.g., a petal patterned substrate) and an imaging sensor (e.g., an FPA) on the patterned substrate. The patterned substrate targets local reduction in the deleterious strain across the imaging sensor, while allowing the imaging sensor to remain near the spherical focal surface for accurate imaging. For example, the patterned substrate may be coupled (e.g., bonded, adhered, deposited, or attached) to a bottom surface of the imaging sensor to form a sensor package, and as the sensor package (e.g., the sensor-patterned substrate laminate) is curved, the patterned substrate maintains a low (or relatively low) tensile stress in the imaging sensor. Overall, the imaging sensor will assume the curvature of the mold. The local changes in the bending stiffness (e.g., the flexural rigidity) of the patterned substrate adjusts and/or changes the stress distribution within the imaging sensor, thereby reducing or preventing stress or strain concentrations and magnitude. Thus, the patterned substrate may adjust the stress distribution across the imaging sensor to mitigate failure and imaging degradation when it is curved. For example, the total strain energy in the imaging sensor package may be reduced by plastic flow of the patterned substrate that occurs during the curving such that even large-format imaging sensors (e.g., imaging sensors having greater than 55 mm diagonal lengths) may be curved to relatively tight radii of curvature. In addition, any wrinkling of the imaging sensor is expected to be low-amplitude wrinkling occurring on a sub-pixel scale (e.g., one light receiving element or pixel is larger than one wrinkle), and therefore, there is no substantial degradation in imaging performance as may be expected from a "wrinkled" imaging sensor.

According to an embodiment of the present disclosure, an imaging sensor package includes: an imaging sensor; and a patterned substrate coupled to a surface of the imaging sensor. The patterned substrate has a petal-shaped patterned area having a first thickness and a base substrate having a second thickness, and the first thickness is greater than the second thickness. The imaging sensor and the patterned substrate are curved.

The imaging sensor may include a detector arranged between a readout integrated circuit and an antireflective coating.

The imaging sensor and the patterned substrate may be spherically curved.

The petal-shaped patterned area may have a central region and a plurality of petal portions extending therefrom, and the petal-shaped patterned area may be radially symmetric.

The base substrate may have a rectangular shape, and the petal-shaped patterned area may have four petal portions respectively extending towards corners of the base substrate.

The petal portions may be spaced apart from the corners of the base substrate.

The petal portions may be spaced apart from the central region of the petal-shaped pattern area by a portion of the base substrate.

The patterned substrate may include aluminum, copper, nickel, iron, invar, steel, titanium, molybdenum, tungsten, and/or bismuth.

A planar size of the base substrate may be at least the same as that of the imaging sensor, and a maximum length or width of the petal-shaped patterned area may be smaller than a corresponding dimension of the imaging sensor.

The imaging sensor package may further include an infill material between the imaging sensor and the patterned substrate.

A thickness of the infill material may be greater at an area overlapping the base substrate than at another area overlapping the petal-shaped patterned area.

The infill material may include a thermosetting polymer, an epoxy, or solder.

According to another embodiment of the present disclosure, a curved imaging sensor package includes: a curved imaging sensor including a detector and a readout integrated circuit below the detector; and a curved patterned substrate coupled to a surface of the readout integrated circuit opposite to the detector. The detector includes a plurality of light detecting elements, and the patterned substrate has a petal-shaped portion with a thickness greater than another portion of the patterned substrate.

The petal-shaped portion may include four petals radially extending from a central region, and the four petals may respectively extend towards corners of the patterned substrate.

The petal-shaped portion has a first thickness in a range of 20 µm to 1,000 µm, and wherein the other portion of the patterned substrate has a second thickness in a range of 20% to 80% of the first thickness.

The patterned substrate may have ribs extending from each of the four petals, and the ribs may have a thickness greater that the other portion of the patterned substrate.

According to another embodiment of the present disclosure, a method of manufacturing a curved imaging sensor package includes: etching a substrate to form a petal-shaped pattern area thereon; applying an infill material onto the etched substrate; adhering an imaging sensor onto the etched substrate to form an imaging sensor package; and curving the imaging sensor package.

The etching the substrate may include: applying a photosensitive polymer to a surface of the substrate in the petal-shaped pattern; and wet etching the surface of the substrate to partially remove uncovered areas of the surface of the substrate.

The method may further include apply an infill material to the etched surface of the substrate.

The adhering of the imaging sensor may include adhering the imaging sensor to the infill material.

BRIEF DESCRIPTION OF THE DRAWINGS

The above-described and other aspects and features of the present disclosure will be further appreciated and better understood with reference to the specification, claims, and appended drawings, in which:

FIGS. 13A-13D show steps of a method of manufacturing an imaging sensor package including a petal patterned substrate; and FIGS. 14A and 14B show other embodiments of an imaging sensor package including a petal patterned substrate.

DETAILED DESCRIPTION

Figure 1:
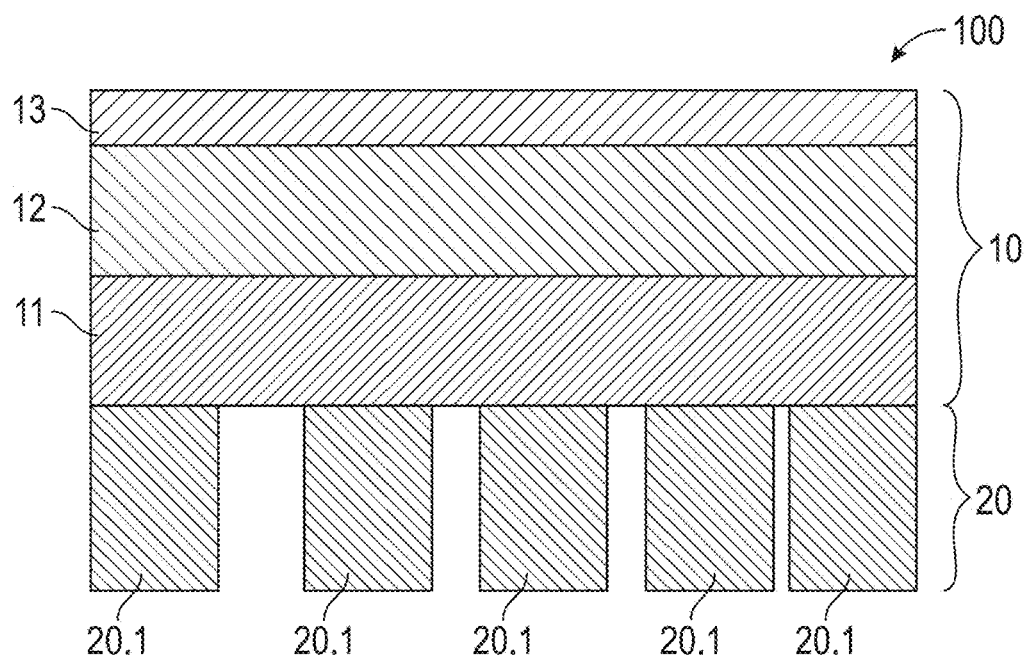
FIG. 1 is a cross-sectional view of an imaging sensor packing according to an embodiment of the present disclosure in a flat state.

The detailed description set forth below, in connection with the appended drawings, is intended as a description of example embodiments of the present disclosure and is not intended to represent the only forms in which the present disclosure may be embodied. The description sets forth aspects and features of the present disclosure in connection with the illustrated example embodiments. It is to be understood, however, that the same or equivalent aspects and features may be accomplished by different embodiments, and such other embodiments are encompassed within the spirit and scope of the present disclosure. As noted elsewhere herein, like reference numerals in the description and the drawings are intended to indicate like elements. Further, descriptions of features, configurations, and/or other aspects within each embodiment should typically be considered as available for other similar features, configurations, and/or aspects in other embodiments.

FIG. 1 shows a cross-sectional view of an imaging sensor package 100 according to an embodiment of the present disclosure. In FIG. 1, the imaging sensor package 100 is shown in a flat state for convenience of description. It is to be understood that the imaging sensor package 100 may be curved in one or more directions (e.g., along one or more axes). Depending on the needs and design of a particular imaging system, the imaging sensor package 100 may be curved to have a spherical, aspherical, cylindrical, parabolic, or any suitable non-planar surface or shape. In one embodiment, the imaging sensor package 100 may be curved to have a spherical curvature (e.g., may be curved along two in-plane axes) (see, e.g., FIGS. 5A and 5B).

Referring to FIG. 1, the imaging sensor package 100 includes an imaging sensor 10 coupled to an architected substrate (e.g., a patterned substrate) 20. Together, the imaging sensor 10 and architected substrate 20 may be referred to as the sensor-substrate laminate or simply as the imaging sensor package 100.

The imaging sensor 10 may include a readout integrated circuit 11, a detector 12 on the readout integrated circuit 11, and an antireflective coating 13 on the detector 12. The architected substrate 20 is arranged below (e.g., is coupled to a bottom surface of) the readout integrated circuit 11. In some embodiments, the imaging sensor 10 may be formed (e.g., separately formed) and then coupled to the architected substrate 20. But in other embodiments, a complete (e.g., unpatterned) substrate may be coupled to the imaging sensor 10 and then patterned to form the architected substrate 20.

The detector 12 may include a plurality of light sensing elements, and the readout integrated circuit 11 may act as a substrate for the light sensing elements. The imaging sensor 10 may be sensitive to (e.g., may receive and interpret) different wavelength ranges of light based on the composition of the detector 12. For example, the detector 12 may be sensitive to visible or infrared (IR) light, and the infrared light may be near infrared radiation (NIR), short-wave infrared radiation (SWIR), medium-wave infrared radiation (MWIR), and/or long-wave infrared radiation (LWIR).

Infrared sensing detectors (e.g., infrared sensing elements) may include a Type II strained layer superlattice (SLS) (e.g., InSb, InAs/InAsSb), a III-V bulk alloy, a photovoltaic material (e.g., mercury cadmium telluride, InSb, PbSnTe, PtSi), a photoconductive material (e.g., mercury cadmium telluride, InSb, InGaAs/InP, Ge, doped silicon), and/or a microbolometer (e.g., vanadium oxide or amorphous silicon). Visible light detectors (e.g., visible light sensing elements) may include a charge-coupled device (CCD) and/or a complementary-metal-oxide semiconductor (CMOS).

The light sensing elements of the detector 12 may be spaced from each other by a distance (e.g., may have a pitch) in a range from about 1 μm to about 40 μm and may be coupled to (e.g., may be formed on) the readout integrated circuit 11. The readout integrated circuit 11 may include a substrate formed or (or including) silicon, germanium, and/or other suitable semiconductor materials and may further include oxide layers and metal lines to act as the readout integrated circuit 11.

Figure 4A:
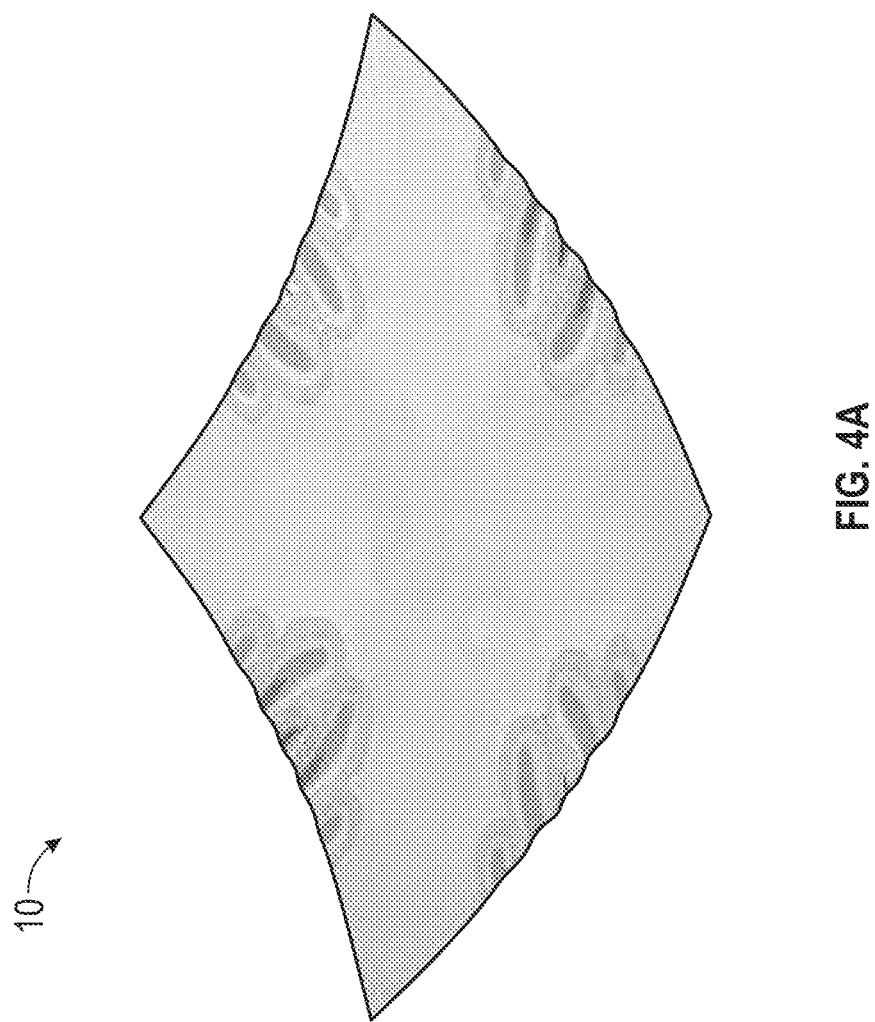
FIGS. 4A and 4B show finite element analyses of a curved imaging sensor without an architected substrate.
Figure 4B:
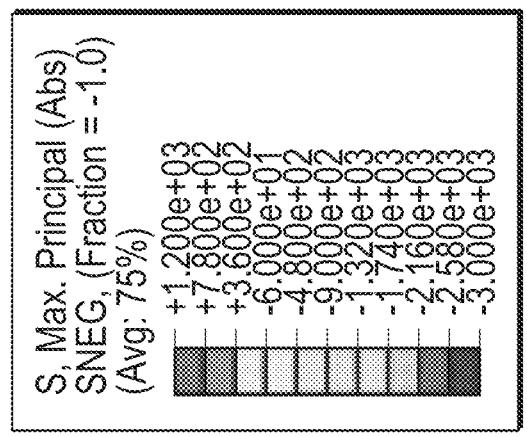
Figure 4B:
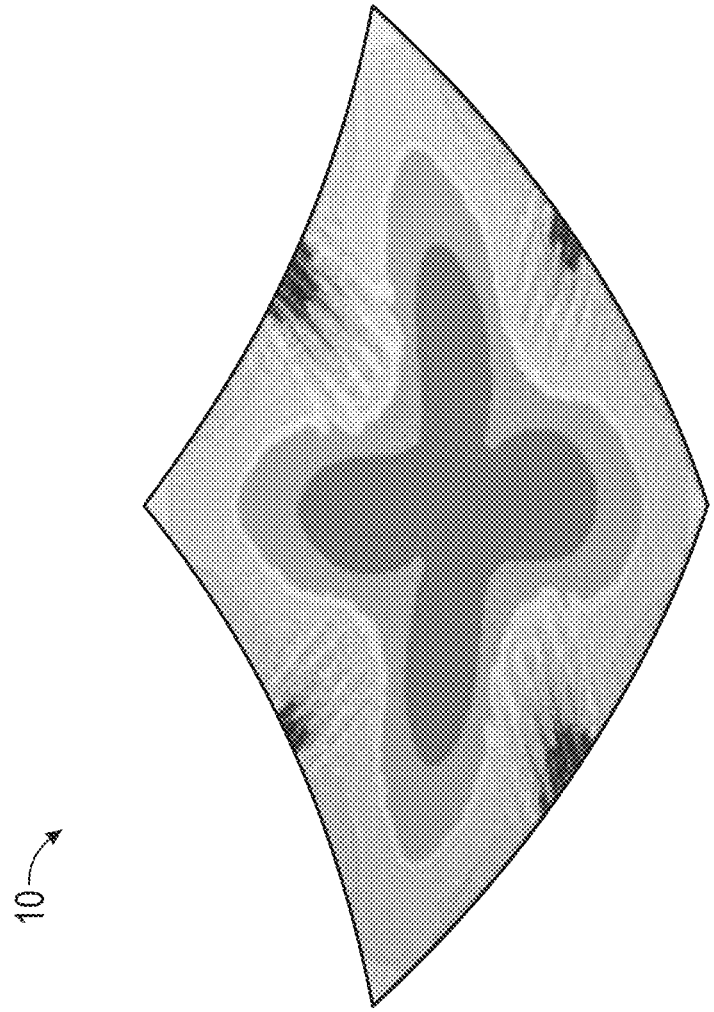

FIGS. 4A and 4B show finite element analyses of an imaging sensor 10 without the architected substrate 20 curved in two directions (e.g., spherically curved). FIG. 4A shows physical deformation of the imaging sensor 10, and FIG. 4B shows stress distribution in the imaging sensor 10.

As can be seen in FIG. 4A, when the imaging sensor 10 without the architected substrate 20 is curved, it undergoes uncontrolled wrinkling primarily concentrated at edge centers, and as can be seen in FIG. 4B, the imaging sensor 10 without the architected substrate 20 experiences relatively high local compressive and tensile stresses.

Figure 5A:
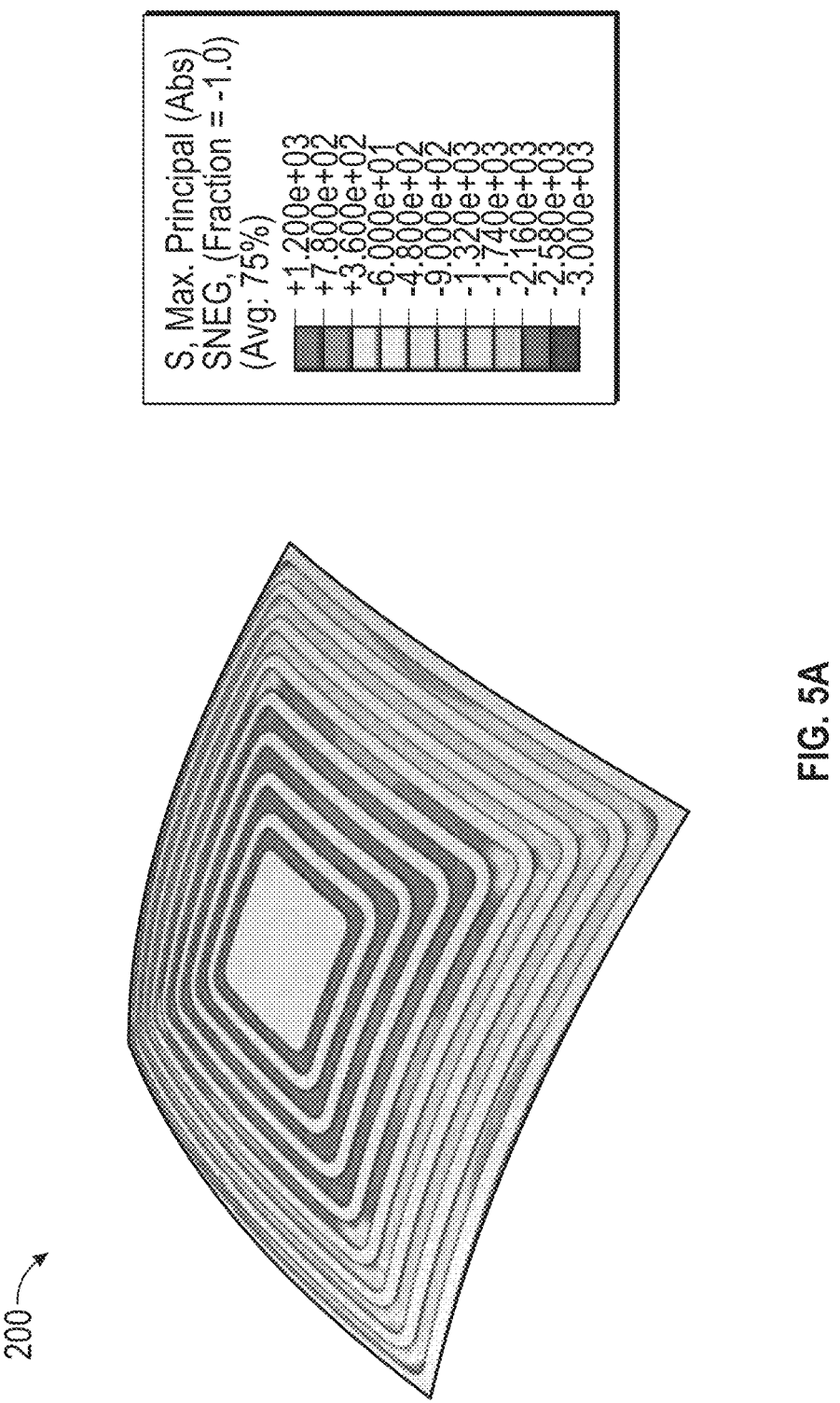
FIGS. 5A and 5B show finite element analyses of a curved imaging sensor package according to embodiments of the present disclosure.
Figure 5B:
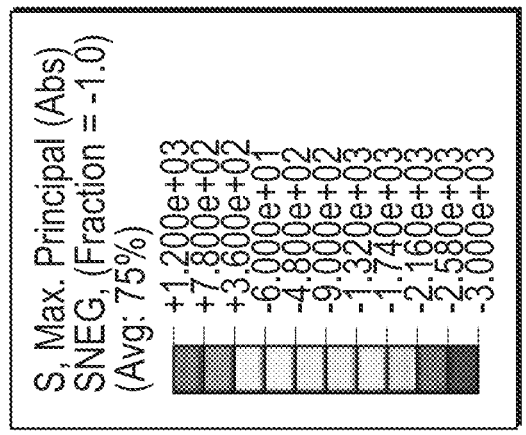
Figure 5B:
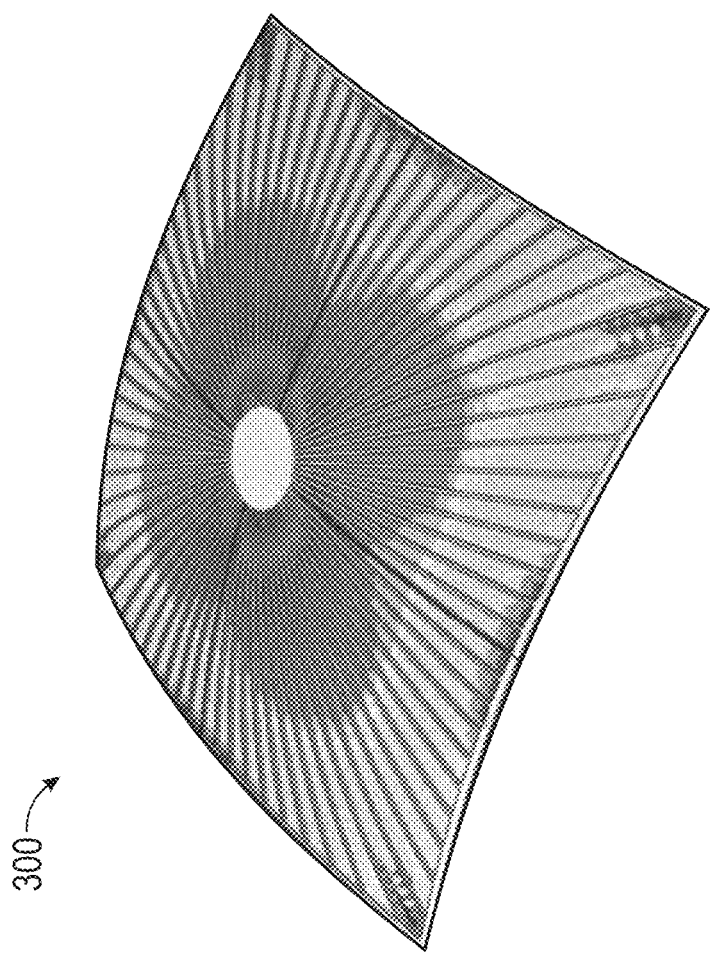

FIGS. 5A and 5B show finite element analyses of different embodiments of the imaging sensor package, which includes the imaging sensor 10 and different embodiments of the architected substrate 20, that is curved in two directions (e.g., that is spherically curved). FIGS. 5A and 5B correspond to FIG. 4B (e.g., show stress distributions) but include the architected substrates.

FIG. 5A shows the stress distributions in the image sensor package 200 that includes an island-type (e.g., square pattern) architected substrate 20, which is described below in more detail. FIG. 5B shows the stress distributions in the image sensor package 300 that includes a radially patterned architected substrate 20, which is also described below in more detail.

As can be seen in FIGS. 5A and 5B, by coupling the architected substrate 20 to the bottom surface of the imaging sensor 10, the stress is less concentrated in the imaging sensor 10 (e.g., the stress is more evenly distributed across the imaging sensor 10), which also reduces uncontrolled wrinkling or buckling with any wrinkling of the imaging sensor 10 being controlled and of (or having) a low-amplitude, as discussed further below. The low-amplitude wrinkling may be considered as local deviations from the ideal curved surface.

Figure 2:
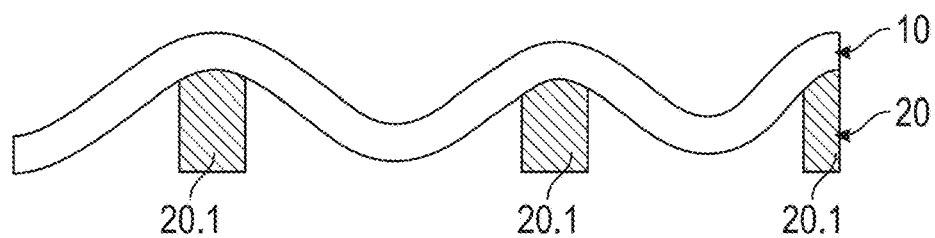
FIG. 2 is a schematic cross-sectional view of the imaging sensor package shown in FIG. 1 shown in a curved state.

That is, the imaging sensors 10 in the imaging sensor packages 200 and 300, shown in FIGS. 5A and 5B, respectively, may or may not experience low-amplitude wrinkling, and even when the imaging sensors 10 experience low-amplitude wrinkling, it is as a sub-pixel scale and does not affect or substantially affect imaging quality. FIG. 2 is a schematic cross-section illustration of the imaging sensor package 100 that shows the low-amplitude wrinkling of the imaging sensor 10 in an exaggerated manner for convenience of description.

Figure 6:
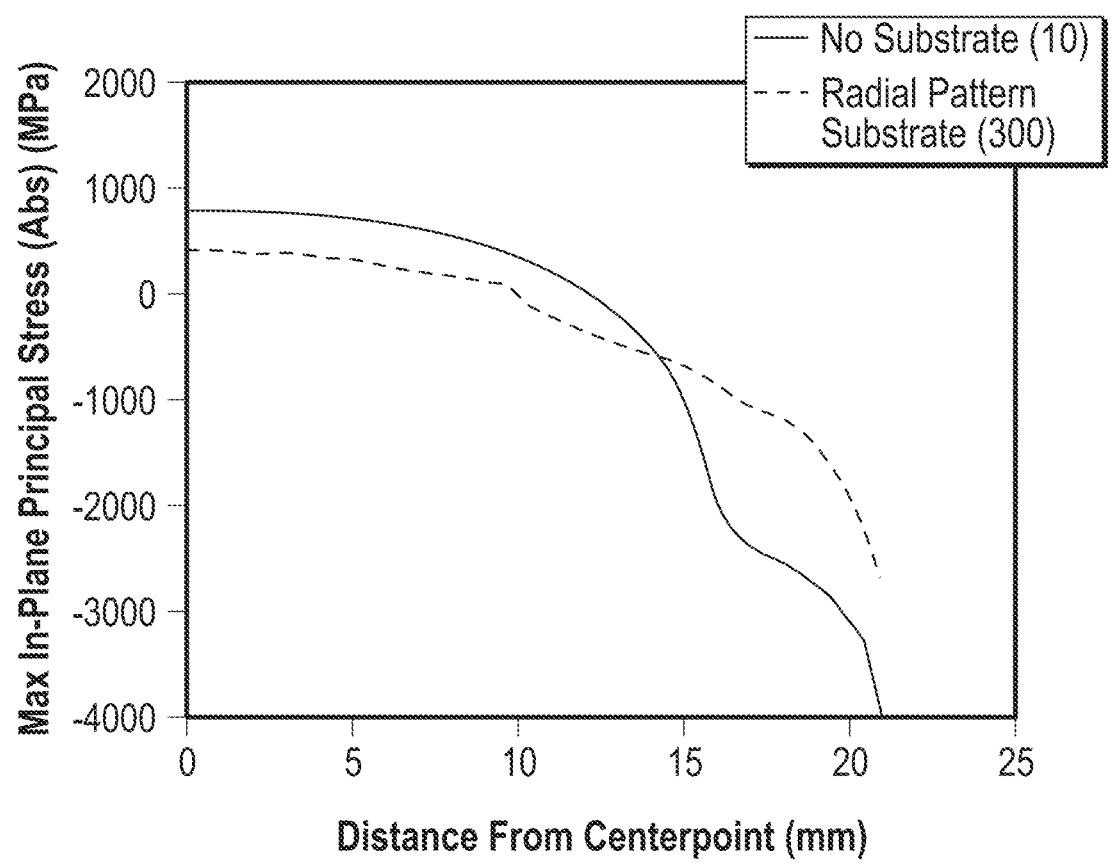
FIG. 6 is a graph showing maximum principal stress distribution across a curved imaging sensor without an architected substrate compared to a curved imaging sensor package including a radially patterned architected substrate according to an embodiment of the present disclosure.

FIG. 6 is a graph showing differences in maximum in-plane stress of an imaging sensor as a function of distance from a center point thereof. The solid line refers to the imaging sensor 10 without an architected substrate (see, e.g., FIGS. 4A and 4B), and the dotted line refers to the curved image sensor package 300 with the radially patterned architected substrate (see, e.g., FIG. 5B). As can be seen, the in-plane stress is much more evenly distributed throughout the imaging sensor package 300 that includes the architected substrate than in the imaging sensor 10 without the architected substrate.

Hereinafter, aspects of embodiments of the architected substrate 20 will be described in more detail. The architected substrate 20 reduces the total strain energy in the imaging sensor 10 by alleviating strain.

The architected substrate 20 may be designed such if any low-amplitude wrinkling of the imaging sensor 10 occurs, it does not affect or substantially affect the imaging quality of the imaging sensor 10. For example, the architected substrate 20 may be designed such that the wavelength of the wrinkling (e.g., the distance between wrinkling peaks) is smaller than the size of one light detecting element (e.g., one pixel); thus, many or all pixels in the imaging sensor 10 are subject to at least one and possibly more than one wrinkle, resulting in substantially consistent impact on light collection efficiency of the light detecting elements and little overall effect on image output. On the other hand, uncontrolled wrinkling, such as may be experience by curved imaging sensors without the architected substrate 20 (see, e.g., FIGS. 4A and 4B) affects pixels differently (e.g., some pixels may be subjected to greater wrinkling than other pixels), causing some pixels to suffer highly degraded light collection efficiency and variant focal lengths compared to other pixels in the same imaging sensor, resulting is a distorted output image. Further, the amplitude of any low-amplitude wrinkling may also be smaller than the pixel size while the wavelength expands beyond the size of the pixel, which improves consistency and output image quality over uncontrolled wrinkling. For example, the amplitude may be less than twice the width of one pixel or may be less than one-quarter the width of one pixel. In some embodiments, the average deviation of the pixel normal from ideal is less than about 45 degrees and may be less than about 10 degrees and, in some embodiments, may be 0 (or about 0) degrees (e.g., may not have any wrinkling).

The architected substrate 20 has non-uniform patterning, such as non-uniform thickness and/or material composition, which create stiffness variations or discontinuities in the architected substrate 20. These stiffness discontinuities (e.g., areas of relatively high and relatively low stiffness) impart a change in bending stiffness and, therefore, the resulting stress in the imaging sensor 10 as it is curved (e.g., as it is curved in a mold). The architected substrate 20 retains (or substantially retains) its volume throughout the curving process.

The architected substrate 20 may have a size that is longer in two directions (referred to as in-plane directions) than in a third direction (referred to as an out-of-plane direction). In some embodiments, the in-plane directions may be a length direction and a width direction of the architected substrate 20, and the out-of-plane direction may be a thickness direction of the architected substrate 20.

The architected substrate 20 may be larger (e.g., may have a larger surface area or volume) or smaller than the imaging sensor 10. For example, the in-plane size (e.g., the surface area) of the architected substrate 20 may be in a range from about 40% to about 200% of the in-plane size (e.g., the surface area) of the imaging sensor 10. In one embodiment, the in-plane size of the architected substrate 20 and the imaging sensor 10 may be the same or substantially the same.

The architected substrate 20 may have an outer profile having a square, rectangular, circular, elliptical, radially symmetric, or arbitrary shape. In one embodiment, the outer profile (e.g., the outer peripheral shape) of the architected substrate 20 and the imaging sensor 10 may be the same or substantially the same.

The architected substrate 20 may have a thickness (e.g., an out-of-plane substrate thickness) in a range between about 0.5 µm and about 800 µm. In some embodiments, the architected substrate 20 may have a thickness in a range from about 0.5 µm to about 5 µm, between about 15 µm and about 100 µm, or between about 100 µm and about 600 µm. When viewed from the perspective of the ratio of the length of the imaging sensor 10 to the greatest thickness of the imaging sensor package 100, the ratio will be between about 20 and about 500. In some embodiments, the ratio will be between about 20 and about 50 to provides regions with larger bending stiffness. In other embodiments the ratio may be between about 200 to about 400 to lower the stored elastic energy in the imaging sensor package 100. The thickness of the architected substrate depends upon effective mechanical properties of the substrate and imaging sensor 10, thickness of the imaging sensor 10, pixel size, and the radii of curvature to which the imaging sensor package 100 is curved.

The thickness of the architected substrate 20 may vary along the length and/or width directions (e.g., may vary along the in-plane position) thereof to create the stiffness discontinuities therein. However, in some embodiments, the thickness of the architected substrate 20 may be uniform. In some embodiments, the architected substrate 20 may be non-continuous (e.g., the thickness may be zero in some areas). In some embodiments, such discontinuities may be provided such that an island-type architected substrate 20 including a plurality of separate pieces is provided, and the separate pieces may be individually coupled to the imaging sensor 10 and not directly coupled to each other. For example, the architected substrate 20 shown in FIGS. 1 and 2 may be an island-type architected substrate 20 including a plurality of separate pieces 20.1. Similarly, the architected substrate shown in FIG. 5A is also an island-type architected substrate. As another embodiment, the architected substrate shown in FIG. 5B has discontinuities (e.g., areas of zero thickness) is a single component as all of the radial fingers of the architected substrate meet at the center thereof. For ease of description, the island-type architected substrate 20 may be considered as a single component with 0 thickness in some areas. That is, the thickness of the architected substrate 20 may vary between full thickness (100%) and no material present, or discontinuous, (0%) along in-plane positions thereon. At areas other than any discontinuous area, the thickness may not be less than 5% the full thickness to reduce risk of breakage or the like. Further, the thickness of the architected substrate 20 may vary continuously (e.g., the thickness transitions may be smooth or relatedly smooth) or discretely (e.g., step differences may be present between different thickness portions).

By varying the thickness of the architected substrate 20 along the in-plane position, the imaging sensor 10 is allowed to deviate from an ideal surface when it is curved (e.g., the imaging sensor 10 may wrinkle or buckle) in a controlled manner to mitigate any stress concentrations in the imaging sensor 10 during curving (or bending), thereby allowing tighter radii of curvature with lower risk of breakage and little, if any, degradation of the imaging performance. As can be seen in FIG. 2, for example, the imaging sensor 10 wrinkles at the lower stiffness portions (e.g., the discontinuous portions) of the architected substrate 20. In this manner, the wrinkling of the imaging sensor 10 may be controlled by designing the thickness variations in the architected substrate 20.

In some embodiments, the architected substrate 20 may have local variations in density in the out-of-plane direction (e.g., in the thickness direction). For example, in some embodiments, the architected substrate may include (or may be formed of) sandwich panels with a core (e.g., a prismatic, lattice, or stochastic core) between the sandwich panels.

Figure 3A:
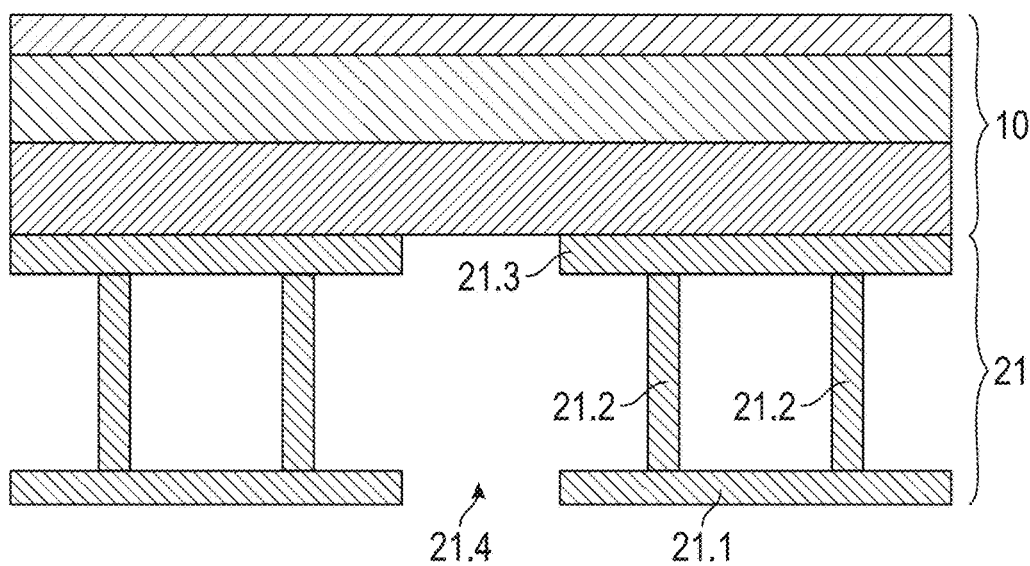
FIGS. 3A-3C show different embodiments of an architected substrate of the imaging sensor package shown in FIG. 1.

Referring to FIG. 3A, the architected substrate 21 includes sandwich panels 21.1, 21.3 with core members 21.2 extending between the sandwich panels 21.1, 21.3 with an opening 21.4 in the architected substrate 21 to form a prismatic architected substrate 21. While only one opening 21.4 in the architected substrate 21 is shown, the present disclosure is not limited thereto, and the architected substrate 21 may include additional openings therein.

The architected substrate 21 has a discontinuous area (e.g., the opening 21.4), which provides a local reduction in stiffness of the architected substrate 21, but in other embodiments, the core members 21.2 may be various arranged to vary the stiffness of the architected substrate 21 along the in-plane position. For example, the core members 21.2 may be spaced farther apart from each other in some areas of the architected substrate 21 than in other areas thereof to create the stiffness discontinuities. In other embodiments, the outermost sandwich panel 21.1 and the core members 21.2 may be removed in one area, leaving only the innermost sandwich panel 21.3, thereby also creating a local area of reduced stiffness.

Figure 3B:
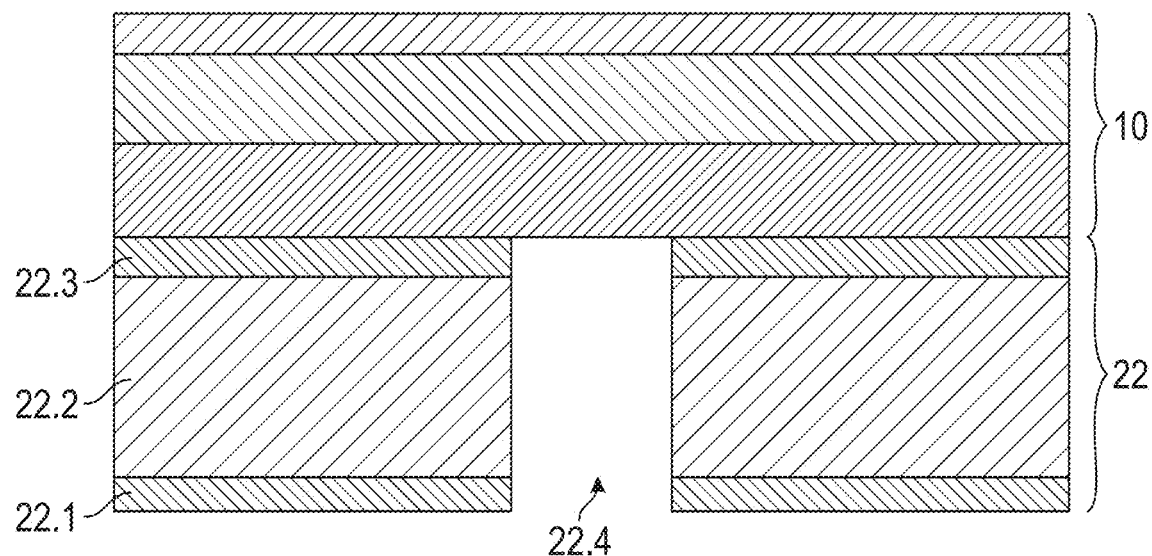

Referring to FIG. 3B, the architected substrate 22 includes a stochastic core 22.2 between sandwich panels 22.1, 22.3, with an opening 22.4 therein.

Figure 3C:
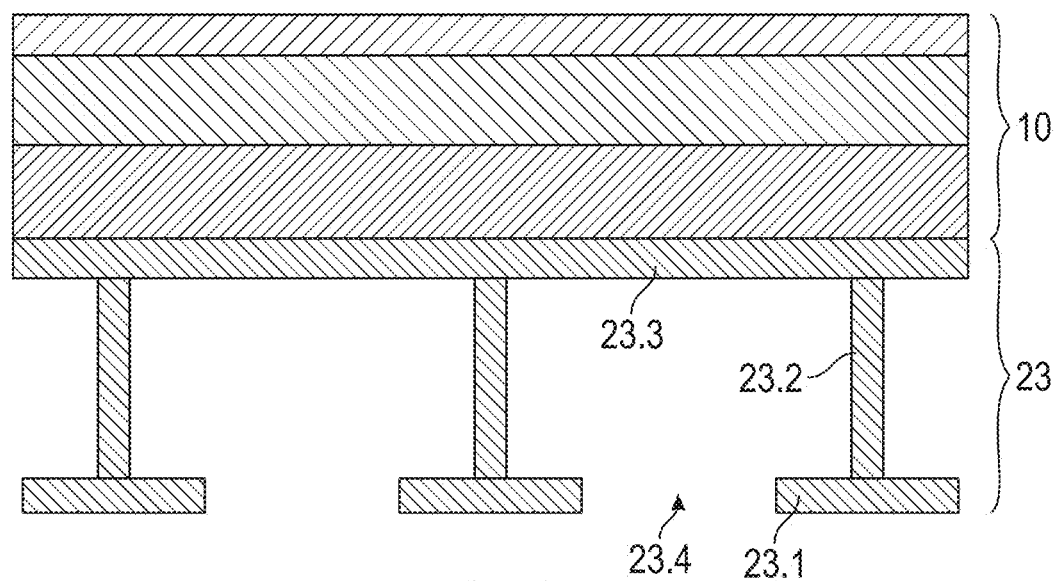

Referring to FIG. 3C, the architected substrate 23 has core members 23.2 with openings 23.4 in only the outermost sandwich panel 23.1, forming a T-shaped architected substrate 23. For example, the innermost sandwich panel 23.3 may extend along the entire imaging sensor 10 and openings 23.4 may only be in the outermost sandwich panel 23.1, but this is merely an example.

In some embodiments, the core (or core member) of the architected substrate 20 may be a microtruss, as provided, for example, in U.S. Pat. Nos. 7,653,279, and 7,382,959, the entire content of each of which is incorporated herein by reference.

The architected substrate 20 may include (or may be formed of) a stiff, ductile material having a modulus that is greater than about 2 GPa and, in some embodiments, is greater than about 70 GPa. For example, in some embodiments, the modulus may be in a range of about 30 GPa to about 200 GPa or in a range of about 70 GPa to about 200 GPa.

The architected substrate 20 may have a strain to failure of about 0.5% or greater and, in some embodiments, may have a strain to failure of greater than about 5%.

The coefficient of thermal expansion (CTE) of the architected substrate 20 may be between about 0 and about 15 ppm/K and, in some embodiments, may be between about 1 ppm/K and about 8 ppm/K.

The architected substrate 20 may include (or may be formed of) metals and metal alloys, including but not limited to, aluminum, copper, nickel, iron, invar, titanium, molybdenum, steel, tungsten, and/or bismuth. In some embodiments, the architected substrate 20 may include (or may be formed of) a polymer or a composite.

In some embodiments, and as another way of forming local stiffness variations, the architected substrate 20 may include a plurality of different materials, and the material composition may vary throughout the architected substrate 20. For example, the material composition of the architected substrate 20 may be a function of in-plane position, out-of-plane position, or both, and the change in material or composition may be discrete or continuous (e.g., the materials may be mixed together and/or partially mixed together at areas of the architected substrate 20).

The thickness, material, and compositional changes described above may or may not follow a pattern.

In some embodiments, the imaging sensor 10 and the architected substrate 20 may be separately formed and then coupled to each other prior to being curved. When the architected substrate 20 has discontinuous portions (e.g., is an island-type architected substrate), it may be considered that a plurality of architected substrates are coupled to the imaging sensor. Similarly, when the architected substrate 20 has material variations in the out-of-plane direction (e.g., the thickness direction), it may be considered that a plurality of architected substrates are coupled to the imaging sensor 10 in the form of layers. For convenience of description, even embodiments including a plurality of architected substrates 20, the overall architected substrate 20 will be referred to in the singular form.

The architected substrate 20 may be coupled to the imaging sensor 10 (e.g., to a bottom surface of the readout integrated circuit 11) by bonding (e.g., a fuse or welding operation), adhering (e.g., using a thermosetting polymer, such as an epoxy or pressure sensitive adhesive), depositing (e.g., electroplating, electroless plating, plasma spray, chemical vapor deposition (CVD), electron-beam CVD, sputter coating, etc.), or attaching (e.g., spin-coating of a polymer followed by UV or thermal cure).

The architected substrate 20 and the imaging sensor 10 may be coupled to each other either when the imaging sensor 10 is at the wafer level (e.g., when a plurality of imaging sensors 10 are joined together on a single wafer) or after singulation of the individual imaging sensors 10.

An interfacial layer may be coupled to the architected substrate 20 before coupling it to the imaging sensor 10 to promote coupling therebetween. In some embodiments, a primer layer and/or a seed layer may also be formed on the architected substrate 20. Further, in some embodiments, an interfacial layer may be coupled to the imaging sensor 10 before coupling it with the architected substrate 20 to promote coupling therebetween. In some embodiments, a primer layer and/or a seed layer may also be formed on the imaging sensor 10 (e.g., on the bottom surface of the readout integrated circuit 11).

In some embodiments, an upper substrate may be coupled to the upper (imaging) surface of the imaging sensor 10 over the antireflective coating 13. The upper substrate may be transparent to the light spectrum of interest to the imaging sensor 10 and may be epitaxially matched to the detector 12 and/or to the substrate of the readout integrated circuit 11. For example, the upper substrate may be formed of (or may include) GaAs and/or GaSb. In some embodiments, the upper substrate may correct for a CTE mismatch between the layers of the imaging sensor 10 and, in such embodiments, may include (or may be formed of) Si.

Referring to FIGS. 7A-14B, other embodiments of the present disclosure are described. For ease of convenience, unless otherwise described differently, all features of the architected substrate 20 described above (e.g., thicknesses, materials, method of bonding, etc.) should be understood to apply to the following embodiments and the differences between the following embodiments and the previously described embodiments will be primarily described.

Figure 7A:
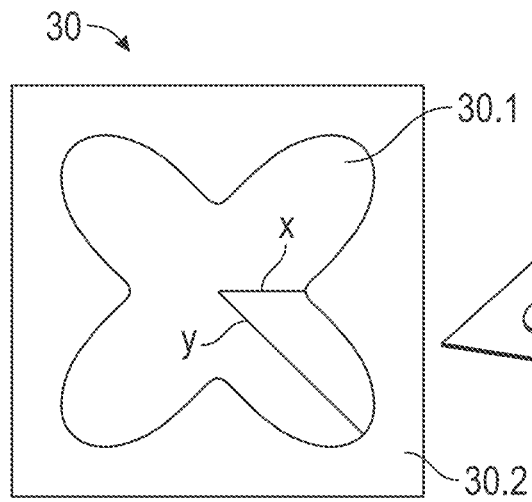
FIGS. 7A-7C show a petal patterned substrate according to an embodiment of the present disclosure.
Figure 7B:
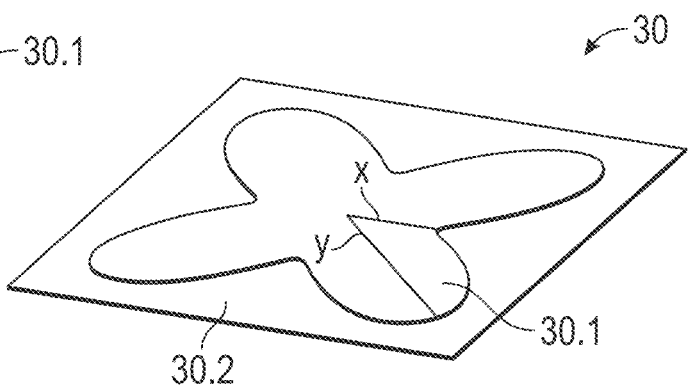
Figure 7C:
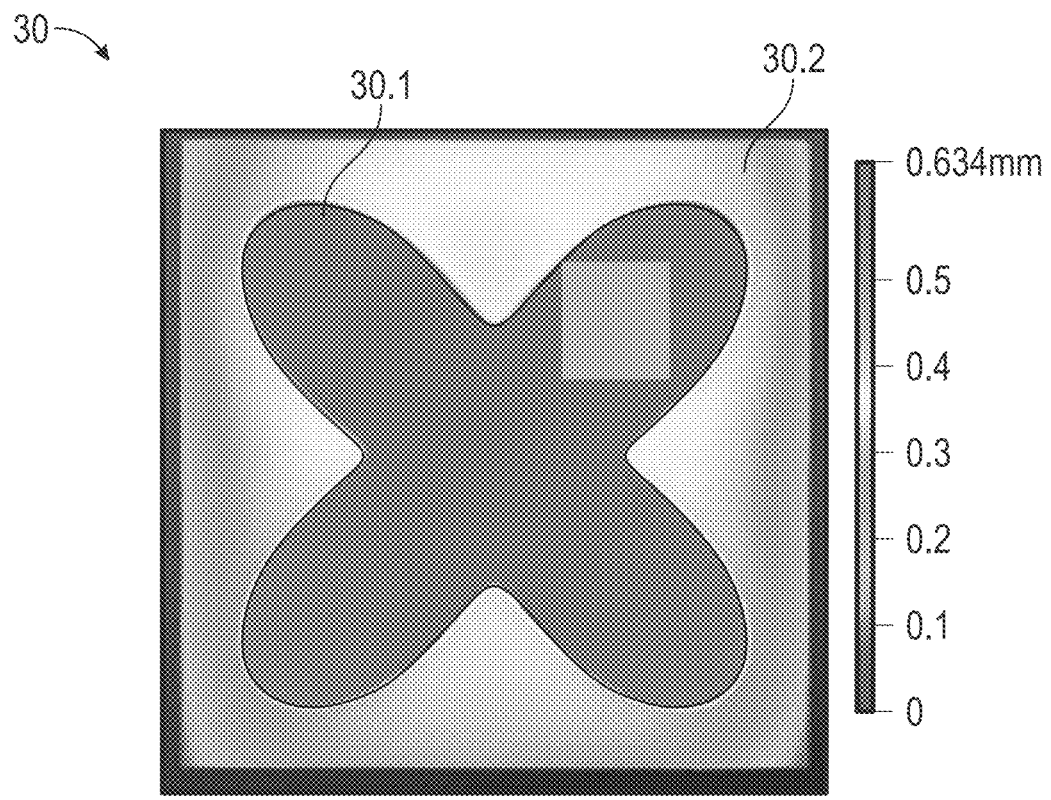
Figure 8A:
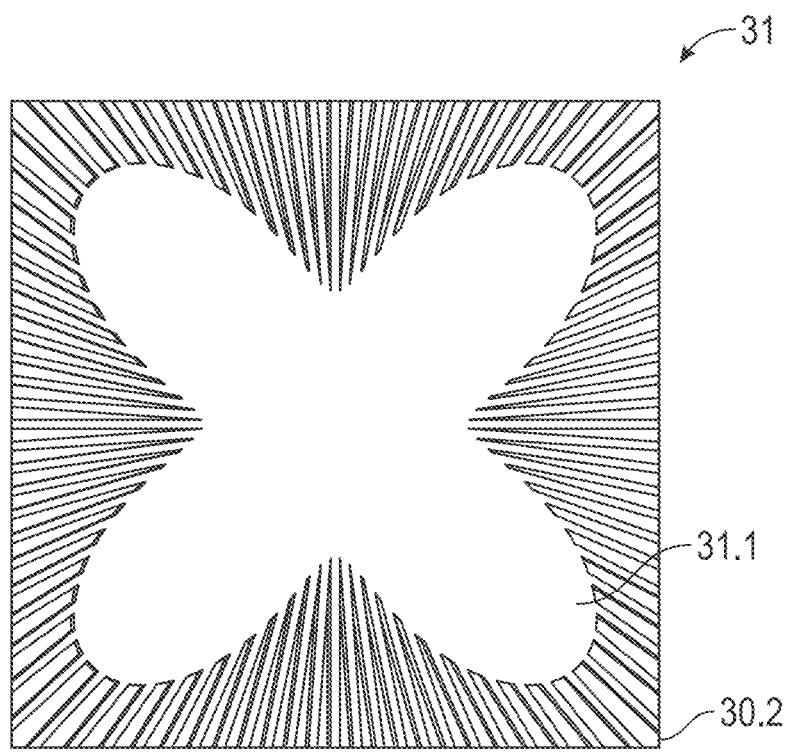
FIGS. 8A and 8B show a petal patterned substrate according to another embodiment of the present disclosure.
Figure 8B:
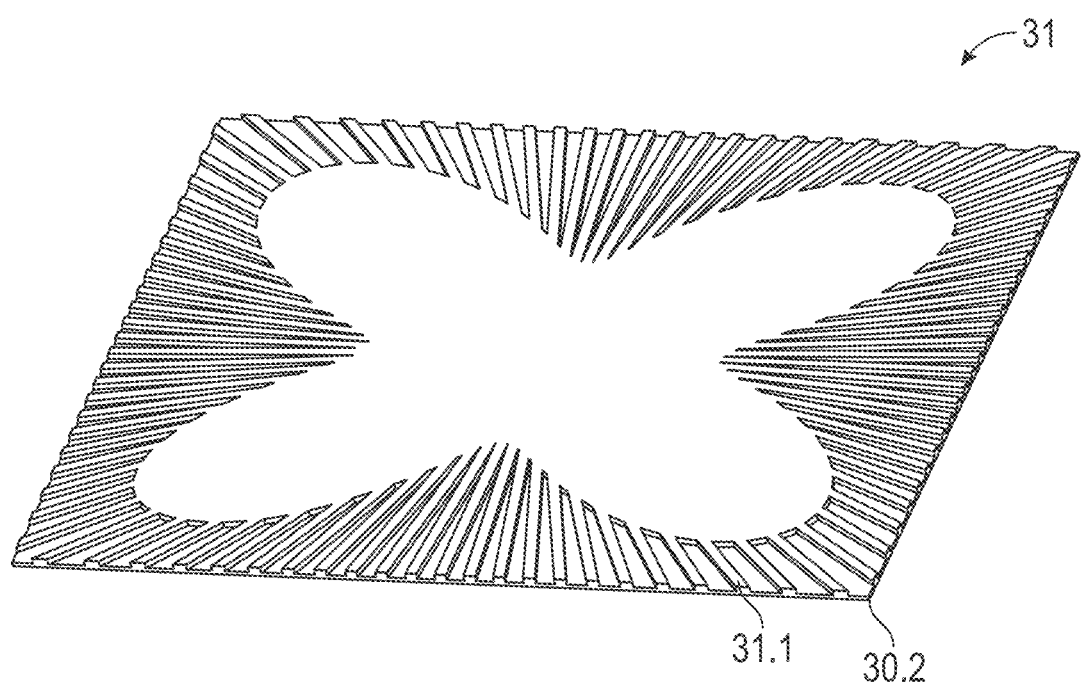

Referring to FIGS. 7A-7C, a petal patterned substrate 30 is shown. The petal patterned substrate 30 may be used in place of the architected substrate 20 described above. For example, the petal pattern substrate 30 may be bonded to the imaging sensor 10 (see, e.g., FIG. 1).

The petal patterned substrate 30 includes a base substrate (or base layer) 30.2 and a patterned portion 30.1 on the base substrate 30.2. However, in some embodiments, the base substrate 30.2 may be omitted (e.g., may be entirely removed by etching). The petal patterned substrate 30 may be formed by wet etching. For example, a photosensitive polymer may be formed on a bare (e.g., unpatterned) substrate 30.2 having a first thickness in a desired pattern. Then, a wet etch is applied to etch the unmasked portions of the bare substrate 30.2, reducing the thickness of the substrate 30.2 at the unmasked areas to a second thickness. As used herein, the terms "first thickness" and "second thickness" refer to a thickness measured from a same reference surface, such as a surface of the base substrate 30.2 opposite to a surface on which the patterned portion 30.1 is formed. Then, the photosensitive polymer is removed to provide the patterned portion 30.1 having the first thickness on the base substrate 30.2 having the second thickness that is less than the first thickness.

In embodiments in which the first thickness of the patterned portion 30.1 varies by position, such thickness variations may be formed by further patterning and etching steps similar to those described above and/or by forming separate patterned portions and stacking and bonding them as layered sheets on a substrate 30.2 to form the patterned portion 30.1. In other embodiments, after the patterned portion 30.1 is etched, it may be electroplated with a suitable material (e.g., a suitable metal). In such an embodiment, the thickness of an electroplating layer may be controlled (e.g., varied) by controlling how electric current flows through the patterned portion 30.1 during the electroplating.

Figure 11:
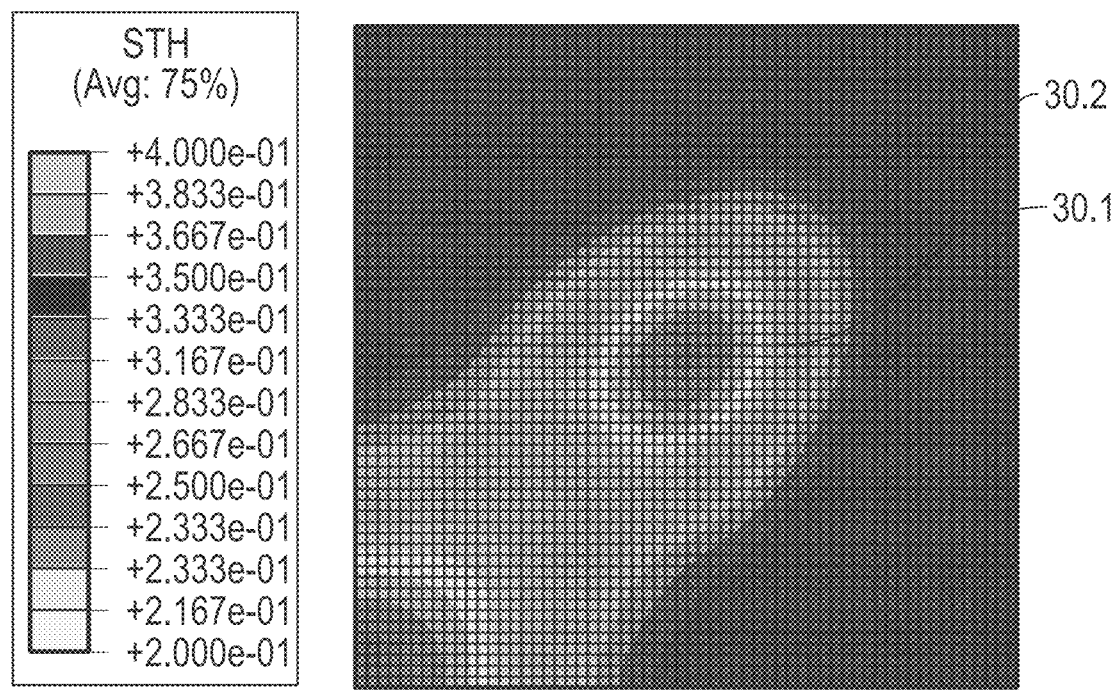
FIG. 11 shows thickness variations within a petal of a petal pattern according to an embodiment of the present disclosure.

The first thickness of the patterned portion 30.1 may be in a range of about 20 µm to about 1,000 µm or in a range of about 100 µm to about 600 µm. The first thickness may be constant across the patterned portion 30.1 or may vary by area across the patterned portion 30.1. In an embodiment in which the first thickness changes across the patterned portion 30.1, the changes (or variations) in the first thickness may be discrete or continuous. FIG. 11 is a graph showing an embodiment in which the first thickness varies across each petal. As can be seen in FIG. 11, the first thickness is greatest at a center of the petal and near the central region of the patterned portion 30.1, while the area of the patterned portion 30.1 between the central region and the petal is relatively thinner. Further, edges of the petal are relatively thinner than the center of the petal, which can help alleviate (or reduce) a step difference between the patterned portion 30.1 and the base substrate 30.2.

The second thickness of the base substrate 30.2, when present, may be in a range of about 20% to about 80% of the first thickness of the patterned portion 30.1 and, in some embodiments, may be in a range of about 30% to about 60% of the first thickness of the patterned portion 30.1. In some embodiment, the second thickness of the base substrate 30.2 may be in a range of about 10 µm to about 500 µm or, in some embodiments, in a range of about 50 µm and about 300 µm. However, the minimum first thickness is greater than or at least equal to the maximum second thickness. In one embodiment, the first thickness of the patterned portion 30.1 may be about 390 µm, and the second thickness of the base substrate 30.2 may be about 130 µm. However, this is a simplified example and, as will be explained in more detail below, different areas of the patterned portion 30.1 may have different thicknesses, and different areas of the base substrate 30.2 may have different thicknesses. As will be described in more detail below, to accommodate the imaging sensor 10 on the petal patterned substrate 30 having different thicknesses, an infill material (e.g., thermosetting polymer, an epoxy, a pressure sensitive adhesive or solder) may be arranged between the petal patterned substrate 30 and the imaging sensor 10.

FIG. 7C is a graph showing an embodiment of the petal patterned substrate 30. As can be seen in FIG. 7C, the first thickness of the patterned portion 30.1 is a constant or substantially constant thickness of about 390 µm while the second thickness of the base substrate 30.2 varies with an average thickness of about 130 µm. In more detail, the second thickness of the base substrate 30.2 increases near a center of the base substrate 30.2 (up to where the patterned portion 30.1 is formed) and decreases toward outer edges of the base substrate 30.2. As can be seen, the thinnest portion of the base substrate 30.2 may be at corners thereof.

The patterned portion 30.1 may be centrally located on the base substrate 30.2 and with respect to the imaging sensor 10 to be bonded thereto. The patterned portion 30.1 may be smaller than the imaging sensor 10 while the base substrate 30.2 may be smaller than, the same size as, or larger than the imaging sensor 10. In embodiments, the in-plane size (e.g., the surface area) of the base substrate 30.2 may be in a range of about 40% to about 200% of the size of the imaging sensor 10. In one embodiment, the base substrate 30.2 may have the same shape and dimensions as that of the imaging sensor 10 to be adhered thereto. In other embodiments, the base substrate 30.2 may have an in-plane size that is in a range of about 0.1 mm to about 1 mm larger than any in-plane dimension (e.g., width or length) of the imaging sensor 10.

The base substrate 30.2 may have a square, rectangular, circular, elliptical, or arbitrary shape. In one embodiment, the base substrate 30.2 may have the same shape as that of the imaging sensor 10 to be adhered thereto.

The patterned portion 30.1 may have a radially symmetric shape with a central region and petals extending from the central region toward corners of the base substrate 30.2. In some embodiments, the patterned portion 30.1 may have both bilateral symmetry (e.g., may be symmetric about a line or axis through the center thereof) and radial symmetry (e.g., may have a repeating pattern around a central axis). In the embodiment shown in FIGS. 7A-7C, the patterned portion 30.1 has a central region at a center of the base substrate 30.2 and has four petals extending from the central region toward corners of the base substrate 30.2. Each of the petals has a smooth, parabolic shape, but the shape of the petals is not limited thereto.

In some embodiments, the petals may be disconnected from the central region of the patterned portion 30.1. For example, taking the shape shown in FIGS. 7A-7C as an example, instead of four petals extending from the central region of the patterned portion 30.1, the patterned portion may have a discrete central region and four island shapes spaced apart from the central region toward the corners of the base substrate 30.2, respectively.

In some embodiments, aspects described above with respect to FIGS. 5A and 5B may be added to the patterned portion. For example, referring to FIGS. 8A and 8B, a petal patterned substrate 31 is illustrated and has a patterned portion 31.1 on a base substrate 30.2. The base substrate 30.2 is the same or substantially the same as described above with respect to FIGS. 7A-7C so it will not be described again.

The patterned portion 31.1 includes the central region and petals extending therefrom as described above with respect to the patterned portion 30.1 shown in FIGS. 7A-7C but also includes radially extending ribs similar to those described above with respect to FIG. 5B. The radially extending ribs may extend in a direction from a center of the patterned portion 31.1 but are only visible at areas outside a periphery of the petals and/or the central region. In other words, the radially extending ribs may be considered as extending from a periphery of the patterned portion 30.1 shown in FIGS. 7A-7C. The ribs may extend to the edge of the base substrate 30.2 or may be spaced apart from the edge thereof.

In some embodiments, ribs extending in a direction other than radially from a center of the patterned portion may be included. For example, referring to FIG. 9A, a petal patterned substrate 32 includes a patterned portion 32.1 including the central region, petals extending from the central region, ribs extending radially from the center of the patterned portion 32.1 toward corners of the base substrate 30.2, ribs extending vertically and horizontally from a center of the patterned portion 32.2 toward edges (e.g., toward midpoints of edges) of the base substrate 30.2, and ribs extending vertically and horizontally between adjacent petals.

Figure 9A:
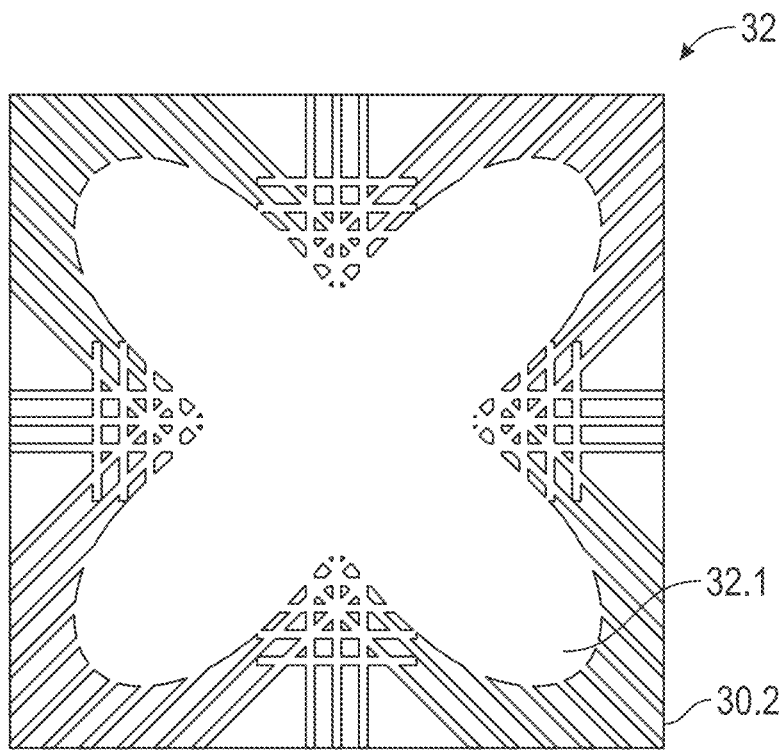
FIGS. 9A and 9B show petal patterned substrates according to other embodiments of the present disclosure.
Figure 9B:
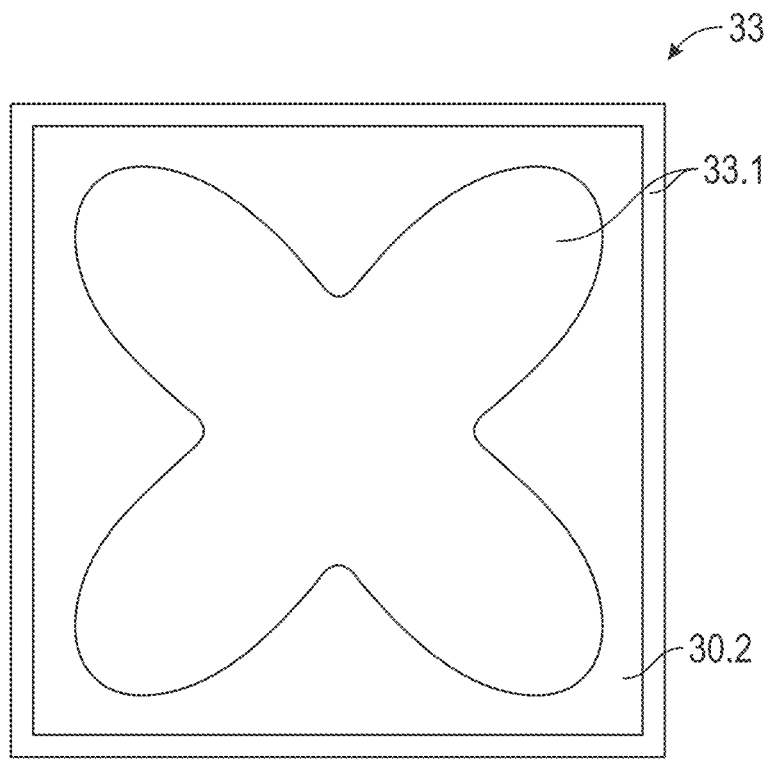
Figure 10A:
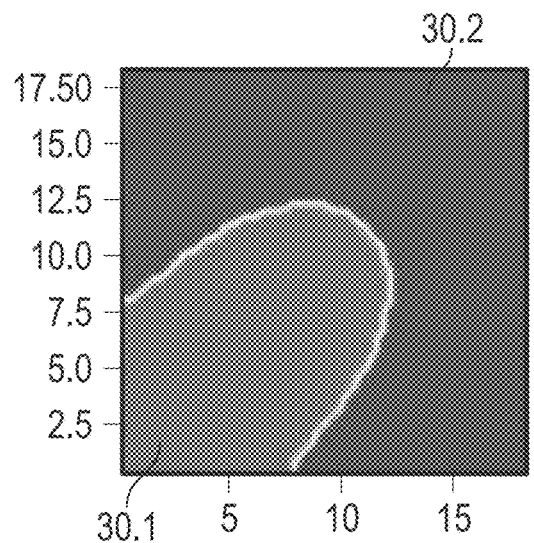
FIGS. 10A-10G show different shapes of petals of a petal pattern according to embodiments of the present disclosure.
Figure 10B:
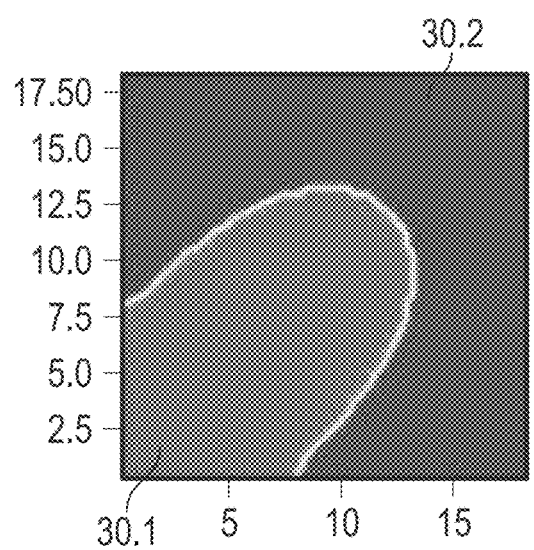
Figure 10C:
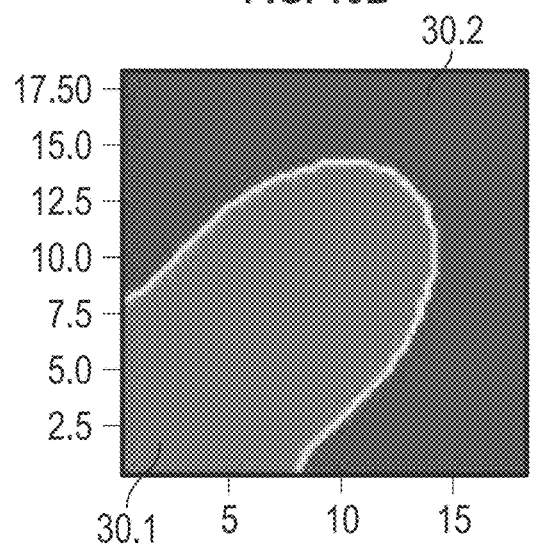
Figure 10D:
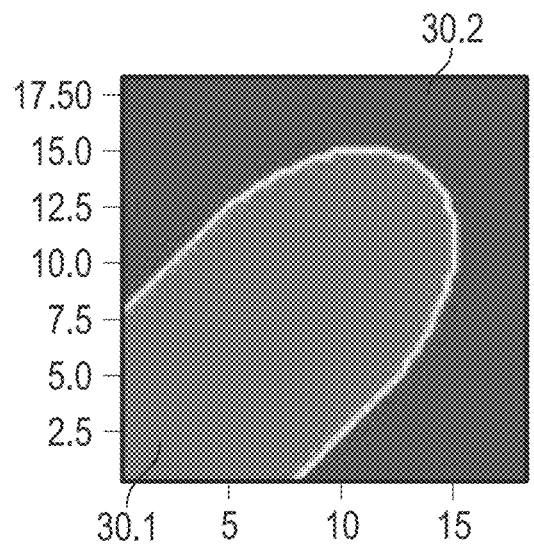
Figure 10E:
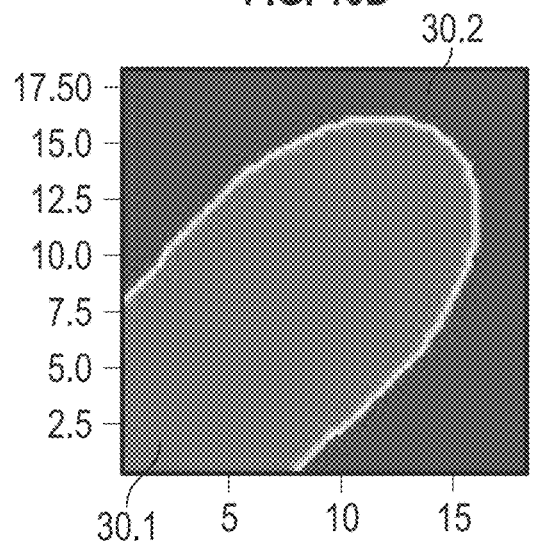
Figure 10F:
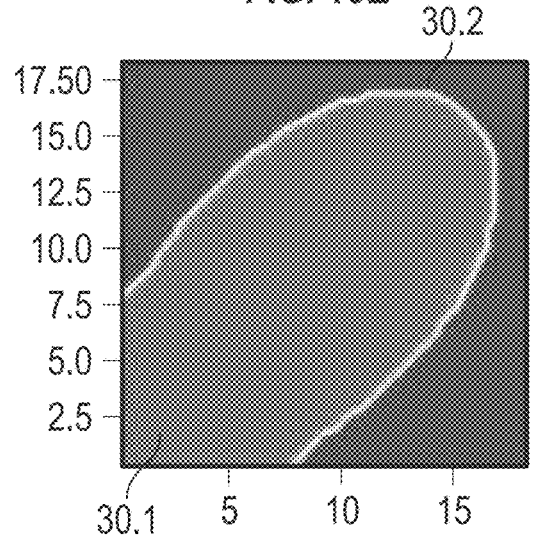
Figure 10G:
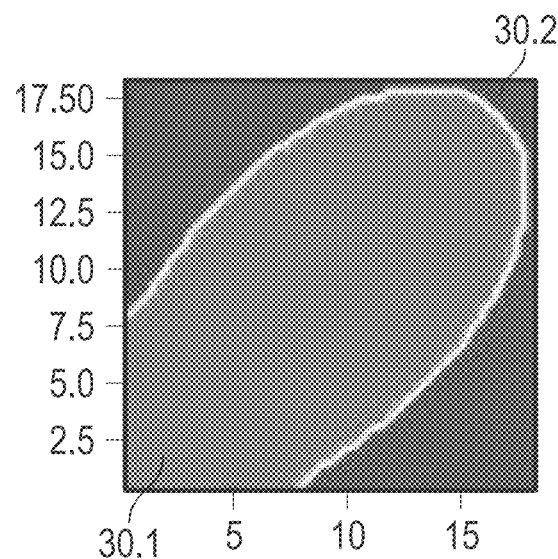

As another example, referring to FIG. 9B, a petal patterned substrate 33 includes a patterned portion 33.1 including the central region, petals extending from the central region, and a continuous rib spaced apart from the central region and the petals and extending along a peripheral edge of the base substrate 30.2. While the rib of the patterned portion 33.1 is shown in FIG. 9B as extending continuously along the edge of the base substrate 30.2, in other embodiments, a plurality of ribs may be arranged along the edge of the base substrate 30.2, for example, along the vertical and horizontal edges of the base substrate 30.2 while not being at the corners thereof.

It should be understood that the arrangement of the ribs is not limited to the examples shown in FIGS. 8A-9B. For example, the described ribs may be included jointly or separately in any number of combinations without limitation. In some embodiments, the ribs may be shaped as grid stiffeners (e.g., as an isogrid).

Further, the petal shapes are not limited to the examples shown in FIGS. 7A-9B. Referring to FIGS. 10A-10G, the petals of any of the above-described patterned portions may extend nearer to or may be positioned farther from the corners of the base substrate 30.2. In FIGS. 10A-10G, the petal is identified by 30.1, but this is simply for ease of description and it should be understood that the petal shapes and sizes shown in FIGS. 10A-10G are available for any of the patterned portions 30.1, 31.1, 32.1, 33.1, etc. As can be seen in, for example, FIG. 10G, the petal 30.1 may extend until it nearly contacts the edge of the base substrate 30.2 on either side of the corresponding corner of the base substrate 30.2.

For reference, in the example shown in FIGS. 7A-7C, a distance x from the center of the central region of the patterned portion 30.1 to an area of the patterned portion 30.1 at where adjacent petals contact each other may be about 7.9 mm, a distance y from the center of the central region of the patterned portion 30.1 to a distal end of the petal may be about 18.3 mm. In this embodiment, the base substrate 30.2 may have lateral dimensions of about 37 mm. However, this is only one example, and the present disclosure is not limited thereto.

Figure 12B:
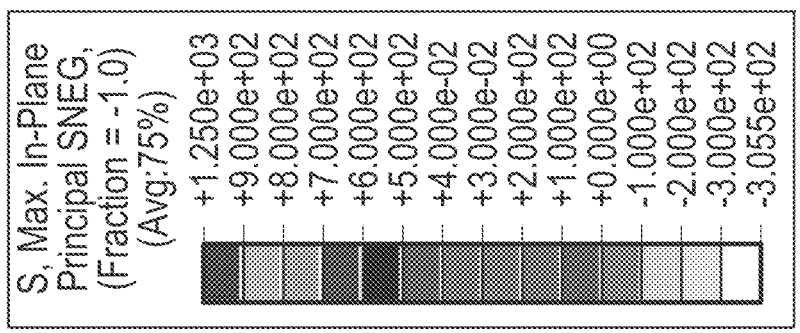
FIGS. 12A and 12B shows results of a finite element analysis of a silicon die by itself and the silicon die on a comparative uniform substrate.
Figure 12B:
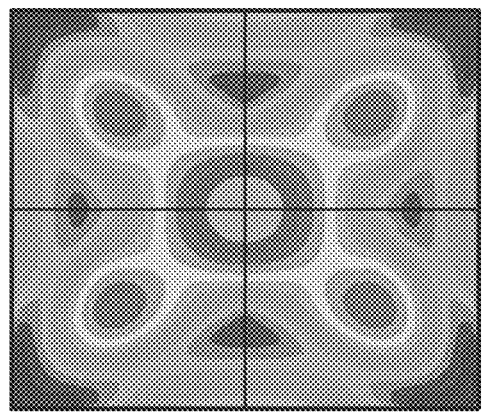
Figure 12D:
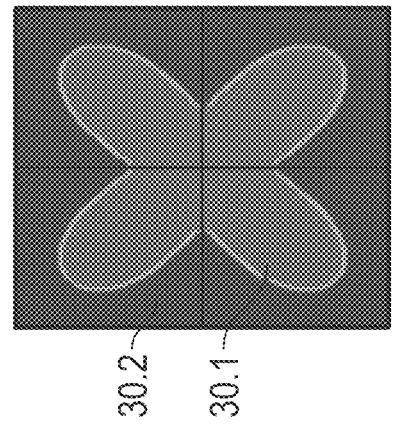
FIG. 12C shows a finite element analysis of a silicone die on a petal patterned substrate having a thickness profile as shown in FIG. 12D.
Figure 12A:
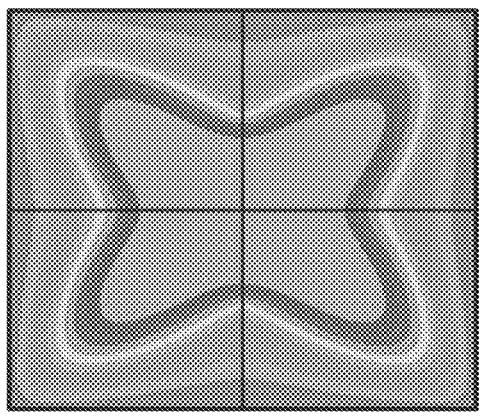
Figure 12C:
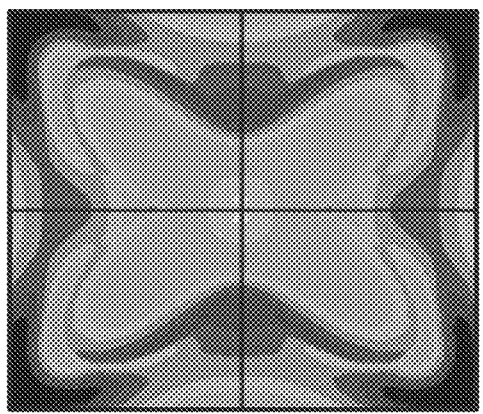

FIGS. 12A-12C show finite element analysis of two comparative examples and one embodiment of the petal patterned substrate according to the present disclosure, and FIG. 12D shows a thickness profile of a petal patterned substrate used in the finite element analysis shown in FIG. 12C. FIGS. 12A-12C show graphs of stresses present in a silicon die. For the purposes of each of these finite element analyses, the silicon die has in-plane dimensions of 51 mm by 44 mm and a thickness of 40 µm and is spherically curved to have a 70 mm radius of curvature. In more detail, FIG. 12A shows a comparative example in which the silicon die is curved without any substrate. Uncontrolled buckling, or wrinkling, in FIG. 12A was numerically suppressed for illustration purposes and to show the stress state in the silicon die should uncontrolled buckling not occur. FIG. 12B shows a comparative example in which a uniform Invar (a well-known nickel-iron alloy) substrate is attached to the convex side of the silicon die before curving and remains attached during the curving process. More specifically, the conventional, uniform Invar substrate used in the example shown in FIG. 12B does not include a petal patterned portion or any patterned portion and instead has a uniform thickness. The Invar substrate used in the example shown in FIG. 12B has in-plane dimensions of 51 mm by 44 mm (the same in-plane dimensions as the silicon die) and a thickness of 300 µm.

FIG. 12C shows an example in which an Invar petal patterned substrate, according to an embodiment of the present disclosure, is attached to the convex side of the silicon die before curving and remains attached during the curving process. FIG. 12D shows the thickness profile of the petal patterned substrate used in the simulation results shown in FIG. 12C. In FIG. 12D, the first thickness of the patterned portion 30.1 is 400 µm, and the second thickness of the base substrate 30.2 is 150 µm.

As can be seen by comparing the comparative examples shown in FIGS. 12A and 12B with the embodiment shown in FIG. 12C, the petal patterned substrate according to embodiments of the present disclosure substantially reduces the tensile stresses within the silicon die. Further, as can be seen in FIG. 12C, a substantially smaller area of the silicon die is subject to maximum stress when it is adhered to the petal patterned substrate according to embodiment than in the comparative examples shown in FIGS. 12A and 12B. Excessive tensile stresses may cause catastrophic fracture in semiconductors materials, which are used in imaging sensors, because such materials have very low fracture toughness. This comparison exemplifies the ability of the petal patterned substrate according to embodiments of the present disclosure to locally reduce tensile stresses within the silicon die, which allows for tighter radii of curvature to be achieved without damage thereto. Furthermore, the silicon die attached to the petal patterned substrate as shown in FIG. 12C does not suffer from uncontrolled wrinkling, different from the silicon die curved without any substrate as shown in FIG. 12A.

A method of manufacturing an imaging sensor package including a petal patterned substrate will now be described with respect to FIGS. 13A-13D. However, this method is applicable to the architected substrate 20, 21, 22, 23, etc. described above. Thus, for ease of description, in FIGS. 13A-13D, a substrate 20/30 will be referred to, which should be understood to refer to any of the above-described architected substrate 20, 21, 22, 23, etc. and any of the petal patterned substrates 30, 31, 32, 33, etc.

Referring to FIG. 13A, a completed (e.g., formed, patterned, etc.) substrate 20/30 is on a handle 50. Then, an infill 35 is applied to the patterned surface of the substrate 20/30 and is overfilled to protrude above any features on the substrate 20/30. In more detail, the infill 35 is a ductile material having a modulus that is less than about 50 GPa. In some embodiments, the infill 35 may be in a range of about 100 MPa to about 10 GPa. Further, the strain to failure of the infill 35 is greater than about 0.5% and, in some embodiments, may be greater than about 5%. The infill 35 may be thermosets, thermoplastics, rubbers, and soft metals and their alloys. In some embodiments, the infill 35 may be a closed cell foam, an open cell foam, or syntactic foam.

Then, referring to FIG. 13B, the upper surface of the infill 35 is planarized. In this step, at least some infill 35 remains on the uppermost features of the substrate 20/30 for adherence to the imaging sensor 10.

Next, referring to FIG. 13C, the imaging sensor 10 is adhered to the substrate 20/30 by the infill 35. For example, the imaging sensor 10 may be brought into contact with the infill 35 and aligned with the substrate 20/30 by another handle 50, on which the imaging sensor 10 is arranged.

Finally, referring to FIG. 13D, the handles 50 are released, providing a completed imaging sensor package 100. Then imaging sensor package 100 may then be curved to a desired curvature according to known curving methods.

Before the imaging sensor 10 is attached to the handle 50 or after the imaging sensor 10 is attached to the substrate 20/30 and the handle 50 is removed, a removable protective layer may be arranged on the exposed surface of the imaging sensor 10. The protective layer may be a self-adhesive tape or deposited layers that can be later removed by chemical etching. The protective layer may help protect the imaging sensor 10 during bending and at later stages of installation into a larger device.

FIGS. 14A and 14B illustrate other embodiments of imaging devices. FIG. 14A shown an embodiment of an imaging sensor package 101 in which the imaging sensor 10 is arranged on a surface of the substrate 20/30 that is not patterned (e.g., a bottom surface of the base substrate 30.2 opposite to the surface on which the patterned portion 30.1 is formed). Further, a secondary substrate 40 may be adhered to the patterned surface of the substrate 20/30 by using the infill 35 as described above with respect to FIGS. 13A-13D. The secondary substrate 40 may be the same material as the substrate 20/30 or any of the above-described materials thereof and may have the same or substantially the same dimensions as the substrate 20/30. In other words, the secondary substrate 40 may be similar to the substrate 20/30 but may omit any architecture or patterned portion(s). FIG. 14B shown an embodiment of an imaging sensor package 102 which is similar to the imaging sensor package 101 described above with respect to FIG. 14A but omits the secondary substrate 40.

The device(s) of the imaging sensor and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

It will be understood that, although the terms "first", "second", "third", etc., may be used herein to describe various elements, components, regions, layers, levels, and/or sections, these elements, components, regions, layers, levels, and/or sections should not be limited by these terms. These terms are only used to distinguish one element, component, region, layer, level, or section from another element, component, region, layer, level, or section. Thus, a first element, component, region, layer, level, or section discussed below could be termed a second element, component, region, layer, level, or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the terms "exemplary" and "example" are intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a curved imaging sensor package with an architected substrate have been described and illustrated herein, many modifications and variations within those embodiments will be apparent to those skilled in the art. Accordingly, it is to be understood that a curved imaging sensor package with an architected substrate according to the present disclosure may be embodied in forms other than as described herein without departing from the spirit and scope of the present disclosure. The present disclosure is defined by the following claims and equivalents thereof.

What is claimed is:

1. An imaging sensor package comprising:
   an imaging sensor; and
   a patterned substrate coupled to a surface of the imaging sensor, the patterned substrate comprising:
      a base substrate having a second thickness; and
      a petal-shaped patterned area on the base substrate and having a first thickness, the first thickness being greater than the second thickness,
   wherein the imaging sensor and the patterned substrate are curved,
   wherein the base substrate has a plurality of corners, and
   wherein the petal-shaped patterned area is radially symmetric about a center point, a distance from the center point of the petal-shaped patterned area to an outer edge of the petal-shaped patterned area is greater toward the corners of the base substrate than toward an edge of the base substrate between two adjacent ones of the corners.

2. The imaging sensor package of claim 1, wherein the imaging sensor comprises a detector arranged between a readout integrated circuit and an antireflective coating.

3. The imaging sensor package of claim 2, wherein the imaging sensor and the patterned substrate are spherically curved.

4. The imaging sensor package of claim 3, wherein the petal-shaped patterned area has a central region and a plurality of petal portions extending therefrom.

5. The imaging sensor package of claim 4, wherein the base substrate has a rectangular shape having four corners, and
   wherein the petal-shaped patterned area has four petal portions respectively extending towards the four corners of the base substrate.

6. The imaging sensor package of claim 5, wherein the petal portions are spaced apart from the four corners of the base substrate.

7. The imaging sensor package of claim 4, wherein the petal portions are spaced apart from the central region of the petal-shaped pattern area by a portion of the base substrate.

8. The imaging sensor package of claim 1, wherein the patterned substrate comprises aluminum, copper, nickel, iron, invar, steel, titanium, molybdenum, tungsten, and/or bismuth.

9. The imaging sensor package of claim 1, wherein a planar size of the base substrate is at least the same as that of the imaging sensor, and
   wherein a maximum length or width of the petal-shaped patterned area is smaller than a corresponding dimension of the imaging sensor.

10. The imaging sensor package of claim 9, further comprising an infill material between the imaging sensor and the patterned substrate.

11. The imaging sensor package of claim 10, wherein a thickness of the infill material is greater at an area overlapping the base substrate than at another area overlapping the petal-shaped patterned area.

12. The imaging sensor package of claim 11, wherein the infill material comprises a thermosetting polymer, an epoxy, or solder.

13. A curved imaging sensor package comprising:
   a curved imaging sensor comprising a detector and a readout integrated circuit below the detector, the detector comprising a plurality of light detecting elements; and
   a curved patterned substrate coupled to a surface of the readout integrated circuit opposite to the detector, the patterned substrate comprising:
      a base substrate having a second thickness; and
      a petal-shaped patterned area on the base substrate and having a first thickness, the first thickness being greater than the second thickness,
   wherein the base substrate has a plurality of corners, and
   wherein the petal-shaped patterned area is radially symmetric about a center point, a distance from the center point of the petal-shaped patterned area to an outer edge of the petal-shaped patterned area is greater toward the corners of the base substrate than toward an edge of the base substrate between two adjacent ones of the corners.

14. The curved imaging sensor package of claim 13, wherein the petal-shaped patterned area comprises four petals radially extending from a central region, the four petals respectively extending towards the corners of the patterned substrate.

15. The curved imaging sensor package of claim 14, wherein the first thickness in a range of 20 µm to 1,000 µm, and
   wherein the second thickness is in a range of 20% to 80% of the first thickness.

16. The curved imaging sensor package of claim 14, wherein the patterned substrate has ribs extending from each of the four petals, the ribs having a thickness greater that the second thickness.

17. A method of manufacturing a curved imaging sensor package, the method comprising:
   etching a substrate to form a base substrate having a second thickness and a petal-shaped patterned area on the base substrate and having a first thickness, the first thickness being greater than the second thickness;
   applying an infill material onto the etched substrate;
   adhering an imaging sensor onto the etched substrate to form an imaging sensor package; and
   curving the imaging sensor package,
   wherein the base substrate has a plurality of corners, and
   wherein the petal-shaped patterned area is radially symmetric about a center point, a distance from the center point of the petal-shaped patterned area to an outer edge of the petal-shaped patterned area is greater toward the corners of the base substrate than toward an edge of the base substrate between two adjacent ones of the corners.

18. The method of claim 17, wherein the etching the substrate comprises:
   applying a photosensitive polymer to a surface of the substrate in the shape of the petal-shaped pattern area; and
   wet etching the surface of the substrate to partially remove uncovered areas of the surface of the substrate to form the base substrate.

19. The method of claim 18, wherein the applying the infill material comprises applying the infill material to the etched surface of the substrate.

20. The method of claim 19, wherein the adhering of the imaging sensor comprises adhering the imaging sensor to the infill material.

21. A curved imaging sensor package comprising:
- a curved imaging sensor comprising a detector and a readout integrated circuit below the detector, the detector comprising a plurality of light detecting elements; and
- a curved patterned substrate coupled to a surface of the readout integrated circuit opposite to the detector, the patterned substrate comprising:
    - a base substrate having a second thickness; and
    - a petal-shaped patterned area on the base substrate and having a first thickness,
- wherein the first thickness is in a range of 20 μm to 1,000 μm, and the second thickness is in a range of 20% to 80% of the first thickness.

* * * * *